(12) United States Patent
Kim et al.

(10) Patent No.: US 7,366,247 B2
(45) Date of Patent: Apr. 29, 2008

(54) ADAPTIVE TRANSMIT ANTENNA DIVERSITY APPARATUS AND METHOD IN A MOBILE COMMUNICATION SYSTEM

(75) Inventors: Hung-Kee Kim, Seoul (KR); Yong-Suk Lee, Yongin-shi (KR); Sung-Jin Kim, Suwon-shi (KR); Kang-Min Lee, Songnam-shi (KR); Yong-Suk Moon, Songnam-shi (KR); Noh-Sun Kim, Suwon-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 587 days.

(21) Appl. No.: 10/611,425

(22) Filed: Jul. 2, 2003

(65) Prior Publication Data

US 2004/0077378 A1 Apr. 22, 2004

(30) Foreign Application Priority Data

Jul. 3, 2002 (KR) ............ 10-2002-0038274

(51) Int. Cl.
*H04B 7/02* (2006.01)
*H04B 1/00* (2006.01)

(52) U.S. Cl. .................. 375/267; 455/69
(58) Field of Classification Search ........ 375/267, 375/259, 295, 316, 299, 346, 347, 260, 130, 375/140, 141, 146, 147, 358, 354; 455/91, 455/101, 133–135, 126; 370/328, 338, 208, 370/209, 335, 347, 343

See application file for complete search history.

(56) References Cited

U.S. PATENT DOCUMENTS 4,718,066 A 1/1988 Rogard
5,634,206 A * 5/1997 Reed et al. .......... 455/277.2

(Continued)

FOREIGN PATENT DOCUMENTS

EP 0 802 636 A2 10/1997

(Continued)

OTHER PUBLICATIONS

Vishwakara R. et al.; "Performance analysis of transmit antenna diversity in 3G WCDMA system" Dec. 17, 2000; pp. 1-4.

*Primary Examiner*—Mohammed Ghayour
*Assistant Examiner*—Vineeta Panwalkar
(74) *Attorney, Agent, or Firm*—Roylance, Abrams, Berdo & Goodman L.L.P.

(57) ABSTRACT

Apparatus and method are disclosed for selecting a transmit antenna diversity scheme according to a variation speed of a fading channel in a mobile communication system. A user equipment (UE) estimates a channel response of a pilot channel by receiving a pilot channel signal from a Node B; estimates a variation speed of a fading channel by using the estimated channel response and determining a transmit antenna diversity scheme suitable to the variation speed of the fading channel; and transmits feedback information including the determined transmit antenna diversity scheme to the Node B, so that the Node B can determine a transmit antenna diversity scheme for a channel signal to be transmitted to the UE based on the transmit antenna diversity scheme information included in the feedback information. In this way, the Node B adaptively applies a transmit antenna diversity according to a channel condition.

16 Claims, 11 Drawing Sheets

U.S. PATENT DOCUMENTS

| | | | |
|---|---|---|---|
| 6,163,571 A | 12/2000 | Asokan et al. | |
| 6,172,970 B1 * | 1/2001 | Ling et al. | 370/347 |
| 6,526,090 B1 * | 2/2003 | Papasakellariou | 375/136 |
| 6,594,473 B1 * | 7/2003 | Dabak et al. | 455/101 |
| 6,658,045 B1 * | 12/2003 | Jin | 375/147 |
| 6,892,059 B1 * | 5/2005 | Kim et al. | 455/272 |
| 6,987,952 B2 * | 1/2006 | Raghothaman | 455/101 |
| 2002/0009156 A1 * | 1/2002 | Hottinen et al. | 375/267 |
| 2002/0060996 A1 | 5/2002 | Kwak et al. | |
| 2002/0093988 A1 * | 7/2002 | Minowa et al. | 370/509 |
| 2003/0156572 A1 * | 8/2003 | Hui et al. | 370/349 |
| 2003/0174675 A1 * | 9/2003 | Willenegger et al. | 370/335 |

FOREIGN PATENT DOCUMENTS

| | | |
|---|---|---|
| EP | 1 073 212 A2 | 1/2001 |
| EP | 1 204 219 A2 | 5/2002 |
| JP | 7-143100 | 6/1995 |
| JP | 2001-44900 | 2/2001 |
| JP | 2002-016532 | 1/2002 |
| WO | WO 01/69814 | 9/2001 |
| WO | WO 02/11315 A3 | 2/2002 |

* cited by examiner

ADAPTIVE TRANSMIT ANTENNA DIVERSITY APPARATUS AND METHOD IN A MOBILE COMMUNICATION SYSTEM

PRIORITY

This application claims priority under 35 U.S.C. § 119 to an application entitled "Adaptive Transmit Antenna Diversity Apparatus and Method in a Mobile Communication system" filed in the Korean Intellectual Property Office on Jul. 3, 2002 and assigned Ser. No. 2002-38274, the contents of which are incorporated herein by reference.

BACKGROUND OF THE INVENTION

1. Field of the Invention

The present invention relates generally to a mobile communication system, and in particular, to an apparatus and method for adaptively determining a transmit antenna diversity scheme according to a channel condition.

2. Description of the Related Art

Generally, high speed downlink packet access (hereinafter referred to as "HSDPA") is the general term for a high speed downlink shared channel (hereinafter referred to as "HS-DSCH") which is a downlink data channel for supporting high speed downlink packet data transmission, its associated control channels, and an apparatus, system and method therefor in a wideband code division multiple access (hereinafter referred to as "W-CDMA") communication system. Although the present invention will be described with reference to HSDPA in 3GPP ($3^{rd}$ Generation Partnership Project), which is a standard of a $3^{rd}$ generation asynchronous mobile communication system. The invention can also be applied to other communication systems which realize transmit diversity by using two or more transmit antennas.

In a communication system using HSDPA, adaptive modulation and coding (hereinafter referred to as "AMC"), hybrid automatic retransmission request (hereinafter referred to as "HARQ"), and fast cell select (hereinafter referred to as "FCS") have recently been introduced to support high speed packet data transmission.

AMC refers to a data transmission scheme for adaptively determining a modulation scheme and a coding scheme of a data channel according to a channel condition between a particular Node B and a user element (UE) thereby improving the overall utilization efficiency of the cell. AMC has a plurality of modulation schemes and coding schemes, and modulates and codes a data channel signal by combining the modulation schemes and coding schemes. Usually, each combination of the modulation schemes and the coding schemes is referred to as "modulation and coding scheme (MCS)", and a plurality of MCSs of a level #1 to a level #n can be defined according to the number of the MCSs. That is, AMC is a technique for improving overall system efficiency of a Node B by adaptively determining an MCS level according to a channel condition between a UE and a Node B wirelessly connected to the UE.

Second, N-channel stop and wait hybrid automatic retransmission request (hereinafter referred to as "N-channel SAW HARQ"), typical HARQ, will be described. In common automatic retransmission request (hereinafter referred to as "ARQ"), an acknowledgement (hereinafter referred to as "ACK") signal and retransmission packet data are exchanged between a UE and a radio network controller (RNC). For HARQ, the following two proposals have been recently provided in order to increase transmission efficiency of ARQ. As a first proposal, HARQ exchanges a retransmission request and a retransmission response between a UE and a Node B. As a second proposal, HARQ temporarily stores defective data and then combines the defective data with its retransmitted data before transmission. Further, in HSDPA, an ACK signal and retransmission packet data are exchanged between the UE and the Node B over a medium access control (MAC) HS-DSCH. Moreover, HSDPA has introduced N-channel SAW HARQ in which N logical channels are formed to transmit several data packets before an ACK signal is received. However, in SAW (Stop and Wait) ARQ, next packet data is not transmitted until an ACK signal for previous packet data is received. Therefore, in some cases, a UE or a Node B must wait for an ACK signal even though the UE or Node B can currently transmit packet data. However, in N-channel SAW HARQ, a UE or a Node B can continuously transmit packet data even before an ACK signal for previous packet data is received, thereby increasing channel efficiency. That is, N logical channels are set up between a UE and a Node B. If the N logical channels can be identified by time or a channel number, a UE receiving packet data can determine a logical channel over which the packet data is received. In addition, the UE can reconfigure the packet data in the right order or soft-combine the corresponding packet data.

Finally, FCS will be described. In FCS, if a UE supporting HSDPA is located in a cell overlapping region, or a soft handover region, a cell having the best channel condition is selected from a plurality of cells. Specifically, if a UE supporting HSDPA enters a cell overlapping region between a first Node B and a second Node B, the UE sets up radio links to a plurality of cells, or Node Bs. A set of the cells to which the UE sets up radio links is referred to as "active set." The UE receives HSDPA packet data only from a cell having the best channel condition among the cells included in the active set, thereby reducing overall interference. Herein, the cell having the best channel condition will be referred to as "best cell." In order to determine the best cell, the UE must periodically monitor channel conditions of the cells included in the active set to determine whether there is any cell having a better channel condition than the current best cell. If there is any cell having a better channel condition, the UE transmits a best cell indicator to all cells belonging to the active set in order to replace the current best cell with the new best cell. The best cell indicator includes an identifier of the new best cell. Each cell in the active set receives the best cell indicator and analyzes a cell identifier included in the received best cell indicator. That is, each cell in the active set determines whether a cell identifier included in the best cell indicator is identical to its own cell identifier. If the cell identifiers are identical to each other, the corresponding cell selected as a new best cell transmits packet data to the UE over HS-DSCH.

As described above, the communication system using HSDPA proposes various new schemes in order to increase a data rate. In addition to the above-mentioned new schemes of AMC, HARQ and FCS, there is a transmit antenna diversity scheme for coping with a fading phenomenon on a radio channel as another scheme for increase a data rate. The transmit antenna diversity scheme refers to a technique for minimizing a transmission data loss due to a fading phenomenon. The signal is transmitted using two or more transmit antennas, thereby increasing a data rate. The transmit antenna diversity scheme will now be described herein below.

Generally, in a radio channel environment in a mobile communication system, unlike a wired channel environment, a signal is received distorted due to various causes such as multipath interference, shadowing, wave attenuation, time-varying noise and time-varying interference, and the like. Fading caused by the multipath interference is related to a reflecting substance or mobility of a user, i.e., a UE, and an actual transmission signal is mixed with an interference signal during reception. Therefore, the reception signal is a transmission signal which suffers from severe distortion. Fading acts as a main cause of deterioration of the performance of a mobile communication system. As a result, since fading can distort amplitude and a phase of a received signal, it is a chief cause of interference for high-speed data communication in a radio channel environment. Thus, research has been performed on he fading phenomenon.

As an effective scheme for solving the fading problem, the transmit antenna diversity scheme attracts public attention. The transmit antenna diversity scheme receives a plurality of transmission signals which suffer from independent fading phenomenon in a radio channel environment, and copes with distortion due to the fading. The transmit antenna diversity scheme includes a time diversity scheme, a frequency diversity scheme, a multipath diversity scheme, and a space diversity scheme. The time diversity scheme effectively copes with a burst error occurring in a radio channel environment by using an interleaving technique. In the frequency diversity scheme, signals transmitted at different frequencies have different multipaths, obtaining diversity gain. The multipath diversity scheme achieves diversity by separating multipath signals since the multipath signals have different fading information. In the space diversity scheme, a Node B or a UE transmits and receives signals by using a plurality of antennas so that the transmission and reception signals experience independent fading, thereby obtaining diversity gain.

The space diversity scheme uses a plurality of transmit and receive antennas. In the space diversity scheme, a Node B generally includes two or more transmit antennas to improve performance of a radio link. Also, a UE can include two or more receive antennas to improve radio link performance. However, the UE has many limitations such as power consumption, miniaturization, lightweightness and complexity, so the space diversity scheme is generally applied to a Node B. For these reasons, a Node B transmits a signal with a plurality of transmit antennas, and a UE receives a signal with one receive antenna. However, there have been proposed various plans to cope with fading of a radio channel by generating diversity gain similar to that in the case where the UE has a plurality receive antennas. In particular, methods of realizing space diversity by using two or more transmit antennas, for a next generation mobile communication system proposed in 3GPP, attracts public attention. A space diversity scheme proposed for the next generation mobile communication system includes a space time transmit diversity (hereinafter referred to as "STTD") scheme which is an open-loop type transmit antenna diversity scheme using space-time coding without state information of a radio channel, and a transmit antenna array (hereinafter referred to as "TxAA") scheme which is a closed-loop transmit antenna diversity scheme using state information of a radio channel, fed back from a UE.

With reference to FIG. 1, a description will now be made regarding a structure of a transmission apparatus that transmits data by using an STTD scheme which is the closed-loop scheme.

FIG. 1 is a block diagram illustrating an example of a data transmission apparatus using an STTD scheme. Referring to FIG. 1, the data transmission apparatus, i.e., a Node B's transmission apparatus, includes an STTD encoder 20 for STTD-encoding input symbols, i.e., input data being subjected to a series of data processing processes such as channel coding and interleaving, a channelization code/scrambling code generator 26 for generating a channelization code and a scrambling code corresponding to each of STTD-encoded symbols output from the STTD encoder 20, multipliers 22 and 24 for multiplying the channelization code and the scrambling code generated from the channelization code/scrambling code generator 26 by the STTD-encoded symbols, multipliers 28 and 30 for multiplying signals output from the multipliers 22 and 24 by corresponding transmission power, and antennas 32 and 34 for transmitting signals output from the multipliers 28 and 34, respectively.

The structure of the data transmission apparatus will now be described in detail herein below.

First, symbols $x_1$ and $x_2$ are applied to the STTD encoder 20 after being subjected to transmission data processing processes such as channel coding and interleaving. The STTD encoder 20 then STTD-encodes the input symbols $x_1$ and $x_2$. A method for STTD-encoding the input symbols $x_1$ and $x_2$ in the STTD encoder 20 will be described below. The input symbols $x_1$ and $x_2$ are converted into encoded symbols $(x_1,x_2)$ and $(-x_2^*,x_1^*)$ through an STTD encoding process given by $$\begin{array}{c} \text{Time Symbol 1} \\ \text{Time Symbol 2} \end{array} \begin{pmatrix} \overset{Ant1}{x_1} & \overset{Ant2}{-x_2^*} \\ x_2 & x_1^* \end{pmatrix} \quad (1)$$

The STTD encoder 20 provides the encoded symbols $(x_1,x_2)$ and $(-x_2^*,x_1^*)$ to the multipliers 22 and the 24, respectively. The multiplier 22 multiplies the encoded symbol $(x_1,x_2)$ output from the STTD encoder 20 by a channelization code and a scrambling code output from the channelization code/scrambling code generator 26, and provides its output to the multiplier 28. The multiplier 24 multiplies the encoded symbol $(-x_2^*,x_1^*)$ output from the STTD encoder 20 by a channelization code and a scrambling code output from the channelization code/scrambling code generator 26, and provides its output to the multiplier 30. The multiplier 28 multiplies a signal output from the multiplier 22 by transmission power $\sqrt{P/2}$ assigned to the $(x_1,x_2)$ and transmits the result signal through the antenna 32. The multiplier 30 multiplies a signal output from the multiplier 24 by transmission power $\sqrt{P/2}$ assigned to the $(-x_2^*,x_1^*)$ and transmits the result signal through the antenna 34.

The signals transmitted via the antennas 32 and 34 are received at a data reception apparatus, i.e., a UE's reception apparatus, and the signals received by the data reception apparatus are expressed as $$r_1 = h_1 x_1 - h_2 x_2^* + n_1$$

$$r_2 = h_1 x_2 + h_2 x_1^* + n_2 \quad (2)$$

In Equation (2), $r_1$ and $r_2$ represent reception signals at a corresponding reception time, $h_1$ and $h_2$ represent channel responses of the antennas 32 and 34, respectively, and $n_1$ and $n_2$ represent additive white Gaussian noises (hereinafter referred to as "AWGN"). The UE's reception apparatus then restores the reception signals received in the form of Equation (2) to the original transmission signals transmitted from the Node B's transmission apparatus, through a demodulation process expressed as $$\hat{x}_1 = r_1 h_1^* + r_2^* h_2 - (|h_1|^2 + |h_2|^2) x_1$$

$$\hat{x}_2 = -r_1^* h_2 + r_2 h_1^* - (|h_1|^2 + |h_2|^2) x_2 \quad (3)$$

As a result, the UE's reception apparatus achieves diversity gain by combining independent fading components from the antennas according to the demodulation process.

The STTD scheme, an open-loop scheme, has been described so far with reference to FIG. 1. Next, feedback information used in the closed-loop transmit diversity scheme will be described with reference to FIG. 2.

FIG. 2 is a diagram illustrating an example of general feedback information used in a closed-loop transmit diversity scheme. Referring to FIG. 2, the feedback information is transmitted from a UE to a UTRAN (UMTS Telecommunication Radio Access Network). For example, the UE transmits the feedback information through a feedback information (FBI) field (not shown) of a dedicated physical control channel (hereinafter referred to as "DPCCH"). The feedback information will be described herein below. The feedback information is comprised of an $N_{ph}$-bit feedback signaling message (hereinafter referred to as "FSM") field i.e., an $FSM_{ph}$ field, representing phase information, and an $N_{po}$-bit FSM field, i.e., an $FSM_{po}$ field, representing power information.

The feedback information used in the closed-loop transmit diversity scheme has been described so far with reference to FIG. 2. Next, a structure of a transmission apparatus that transmits data by using a TxAA scheme which is a closed-loop scheme will be described with reference to FIG. 3.

Before a description of FIG. 3, the TxAA scheme will be described below. An operation mode of the TxAA scheme is roughly divided into a first TxAA mode (hereinafter referred to as "TxAA Mode1") and a second TxAA mode (hereinafter referred to as "TxAA Mode2"). First, the TxAA Mode1 will be described. In the TxAA Mode1, a UE calculates weights $w_1$ and $w_2$ to be used in a UTRAN by using a pilot signal transmitted from a Node B so that reception power of a received signal can be maximized. That is, the UE calculates a relative phase difference between a first antenna ANT1 and a second antenna ANT2 for each slot, quantizes the calculated phase difference, and transmits the quantized phase difference to a Node B. The phase difference is expressed in two values of π and 0, and the UE sets the phase difference to 1 and 0 through the $FSM_{ph}$ field, and transmits the set phase difference to a UTRAN, i.e., Node B.

The Node B calculates a relative phase difference $\phi_1$ of the second antenna ANT2 by using Table 1 below, for an $FSM_{ph}$ value of each slot. Thereafter, the Node B calculates a weight vector of the second antenna ANT2 by using the $\phi_1$ in accordance with $$w_1 = \frac{1}{\sqrt{2}}, \quad w_2 = \frac{\sum_{i=n-1}^{n} \cos(\phi_i)}{2} + j\frac{\sum_{i=n-1}^{n} \sin(\phi_i)}{2} \quad (4)$$

16, and each of the 16 weights has a value distinguished into phase and amplitude. The feedback information distinguished into phase and amplitude, i.e., $FSM_{ph}$ and $FSM_{po}$, are shown in Table 2 and Table 3 below.

TABLE 2

| $FSM_{po}$ | Power_ant1 | Power_ant2 |
|---|---|---|
| 0 | 0.2 | 0.8 |
| 1 | 0.8 | 0.2 |

TABLE 3

| $FSM_{ph}$ | Phase difference between antennas (radians) |
|---|---|
| 000 | π |
| 001 | −3π/4 |
| 011 | −π/2 |
| 010 | −π/4 |
| 110 | 0 |
| 111 | π/4 |
| 101 | π/2 |
| 100 | 3π/4 |

Table 2 illustrates values of $FSM_{po}$. For example, when a value of $FSM_{po}$ is set to 0, if amplitude Power_ant1 of a first antenna is 0.2, then amplitude Power_ant2 of a second antenna is set to 0.8. Table 3 illustrates values of $FSM_{ph}$. For example, when a value of $FSM_{ph}$ is set to 000, a phase difference between antennas (radian) is set to π.

Thus, weight vectors of the first and second antennas are calculated by $$w = \begin{bmatrix} \sqrt{\text{power\_ant1}} \\ \sqrt{\text{power\_ant2}} \exp(j \text{ phase\_diff}) \end{bmatrix} \quad (5)$$

8

The data transmission apparatus of FIG. 3 will now be described herein below.

FIG. 3 is a block diagram illustrating an example of a data transmission apparatus using the TxAA scheme. Referring to FIG. 3, the data transmission apparatus, i.e., a Node B's transmission apparatus, includes a channelization code/scrambling code generator 44 for generating a channelization code and a scrambling code corresponding to each of input symbols, i.e., input data being subjected to a series of data processing processes such as channel coding and interleaving, multipliers 40 and 42 for multiplying the channel-

TABLE 1

| Slot #i | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| SFM 0 | 0 | π/2 | 0 | π/2 | 0 | π/2 | 0 | π/2 | 0 | π/2 | 0 | π/2 | 0 | π/2 | 0 |
| 1 | π | −π/2 | π | −π/2 | π | −π/2 | π | −π/2 | π | −π/2 | π | −π/2 | π | −π/2 | π |

Next, the TxAA Mode2 will be described herein below. Unlike the TxAA Mode1, the TxAA Mode2 adjusts both phase and amplitude, i.e., power information. That is, although the TxAA Mode1 adjusts only phase, the TxAA Mode2 adjusts not only the phase but also amplitude. Currently, the total number of weights available in the UE is ization code and the scrambling code generated from the channelization code/scrambling code generator 44 by the input symbols, multipliers 46 and 48 for multiplying signals output from the multipliers 40 and 42 by corresponding weights, multipliers 50 and 52 for multiplying signals output from the multipliers 46 and 48 by a corresponding power, and antennas 54 and 56 for transmitting signals output from the multipliers 50 and 52, respectively.

The structure of the data transmission apparatus will now be described in detail below.

First, symbols $(x_1, x_2)$ are applied to the multipliers 40 and 42 after being subjected to transmission data processing processes such as channel coding and interleaving. The multiplier 40 multiplies the input symbols $(x_1, x_2)$ by a channelization code and a scrambling code output from the channelization code/scrambling code generator 44, and then provides its output to the multiplier 46. The multiplier 42 multiplies the input symbols $(x_1, x_2)$ by a channelization code and a scrambling code output from the channelization code/scrambling code generator 44, and then provides its output to the multiplier 48. The multiplier 46 multiplies a signal output from the multiplier 40 by a corresponding weight $w_1$, and then provides its output to the multiplier 50. The multiplier 50 multiplies a signal output from the multiplier 46 by corresponding transmission power $\sqrt{P/2}$, and then transmits the resulting signal via the antenna 54. The multiplier 48 multiplies a signal output from the multiplier 42 by a corresponding weight $w_2$, and then provides its output to the multiplier 52. The multiplier 52 multiplies a signal output from the multiplier 48 by corresponding transmission power $\sqrt{P/2}$, and then transmits the result signal via the antenna 56.

The transmit antenna diversity schemes described above show different performances according to a speed (or rate) of a fading channel, i.e., a variation speed of a fading channel.

For example, if a moving speed of a UE is lower than 20 Km/h, the TxAA Mode2 scheme achieves the best diversity gain, and if a moving speed of the UE ranges from 20 Km/h to 70 Km/h, the TxAA Mode1 scheme shows the best diversity gain. If a moving speed of the UE is higher than 70 Km/h, the STTD scheme shows the best diversity gain. As mentioned above, since a transmit antenna diversity scheme capable of maximizing diversity gain is different according to a moving environment of the UE or a condition of a radio channel, there is a demand for a method of selecting the most appropriate transmit antenna diversity scheme according to circumstances.

SUMMARY OF THE INVENTION

It is, therefore, an object of embodiments of the present invention to provide an apparatus and method for adaptively applying a transmit antenna diversity scheme according to a channel condition in a mobile communication system.

It is another object of embodiments of the present invention to provide an apparatus and method for adaptively applying a transmit antenna diversity scheme according to a variation speed of a fading channel in a mobile communication system.

To achieve the above and other objects, embodiments of the invention provide an apparatus for selecting one of first and second transmit antenna diversity schemes by a user equipment (UE) in a system including a Node B transmitter which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from the UE. The apparatus comprises a channel estimator for receiving a first channel signal from the Node B transmitter, and estimating a channel response from the received first channel signal; a determiner for estimating a variation speed of the first channel based on the estimated channel response, and selecting one of the first and second transmit antenna diversity schemes according to the estimated variation speed of the first channel; and an information generator for generating information indicating the selected transmit antenna diversity scheme.

To achieve the above and other objects, embodiments of the invention provide an apparatus for selecting, by a Node B, one of first and second transmit antenna diversity schemes and transmitting a channel signal according to the selected transmit antenna diversity scheme in a system including the Node B which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from a user equipment (UE). The apparatus comprises an information extractor for receiving a first channel signal from the UE, and detecting, from the received first channel signal, information indicating one of the first and second transmit antenna diversity schemes, selected by the UE; a controller for determining a transmit antenna diversity scheme to be applied to channel signals to be transmitted by the Node B, based on the detected information; and a transmitter for encoding the channel signals according to the determined transmit antenna diversity scheme and transmitting the encoded channel signals.

To achieve the above and other objects, embodiments of the invention provide a method for selecting one of first and second transmit antenna diversity schemes by a user equipment (UE) in a system including a Node B transmitter which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from the UE. The method comprises receiving a first channel signal from the Node B transmitter; estimating a channel response from the received first channel signal; estimating a variation speed of the first channel based on the estimated channel response; selecting one of the first and second transmit antenna diversity schemes according to the estimated variation speed of the first channel; and transmitting information indicating the selected transmit antenna diversity scheme to the Node B transmitter.

To achieve the above and other objects, embodiments of the invention provide a method for selecting, by a Node B, one of first and second transmit antenna diversity schemes and transmitting a channel signal according to the selected transmit antenna diversity scheme in a system including the Node B which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from a user equipment (UE). The method comprises receiving a first channel signal from the UE; detecting, from the received first channel signal, information indicating one of the first and second transmit antenna diversity schemes, selected by the UE; determining a transmit antenna diversity scheme to be applied to channel signals to be transmitted by the Node B, based on the detected information; and encoding the channel signals according to the determined transmit antenna diversity scheme and transmitting the encoded channel signals.

BRIEF DESCRIPTION OF THE DRAWINGS

The above and other objects, features and advantages of embodiments of the present invention will become more apparent from the following detailed description when taken in conjunction with the accompanying drawings, in which.

DETAILED DESCRIPTION OF THE PREFERRED EMBODIMENT

Several embodiments of the present invention will now be described in detail with reference to the accompanying drawings. In the following description, a detailed description of known functions and configurations has been omitted for conciseness.

Embodiments of the present invention provides an apparatus and method for adaptively applying a transmit antenna array (hereinafter referred to as "TxAA") scheme which is a closed-loop scheme requiring feedback information from a user equipment (hereinafter referred to as "UE") and a space time transmit diversity (hereinafter referred to as "STTD") scheme which is an open-loop scheme not requiring the feedback information, according to a channel environment in a mobile communication system supporting high speed downlink packet access (hereinafter referred to as "HSDPA") and high-speed data transmission. As described above in the background section of the application, an operation of the TxAA scheme is roughly divided into a first TxAA mode (hereinafter referred to as "TxAA Mode1") and a second TxAA mode (hereinafter referred to as "TxAA Mode2").

A structure of a Node B apparatus according to an embodiment of the present invention will now be described with reference to FIG. 4.

Figure 1:
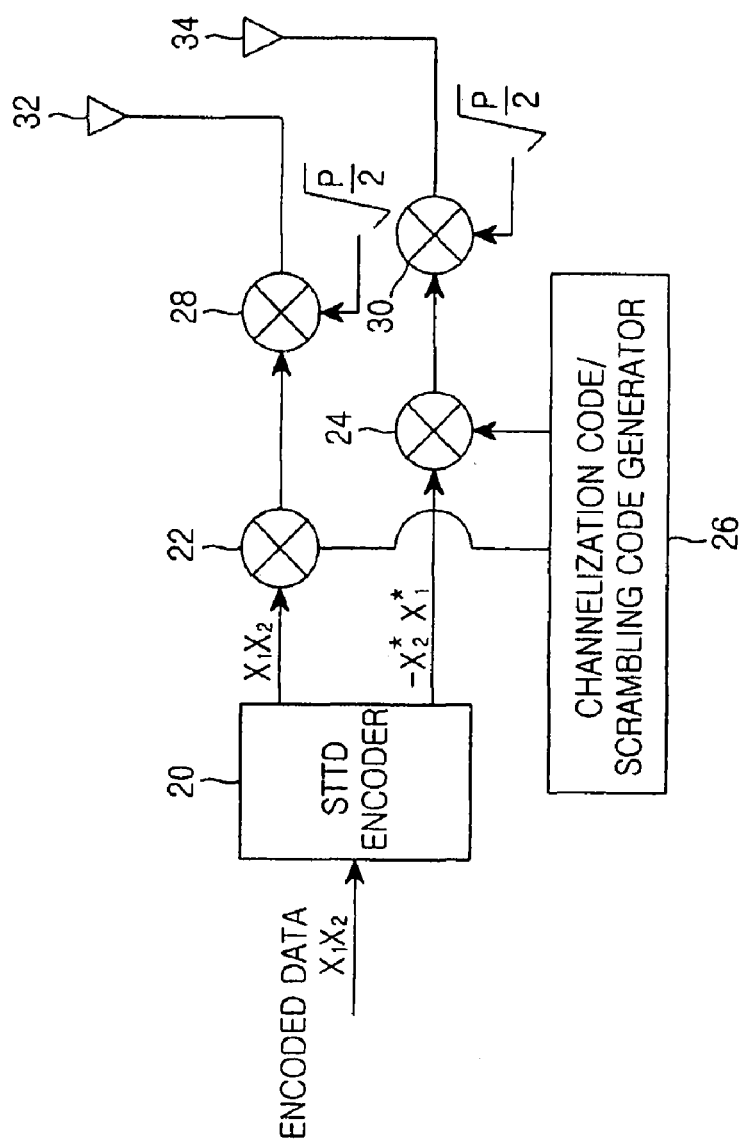
FIG. 1 is a block diagram illustrating an example of a data transmission apparatus using an STTD scheme.
Figure 2:
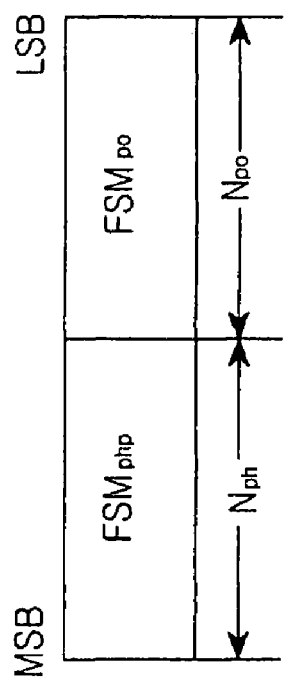
FIG. 2 is a diagram illustrating an example of general feedback information used in a closed-loop transmit diversity scheme.
Figure 3:
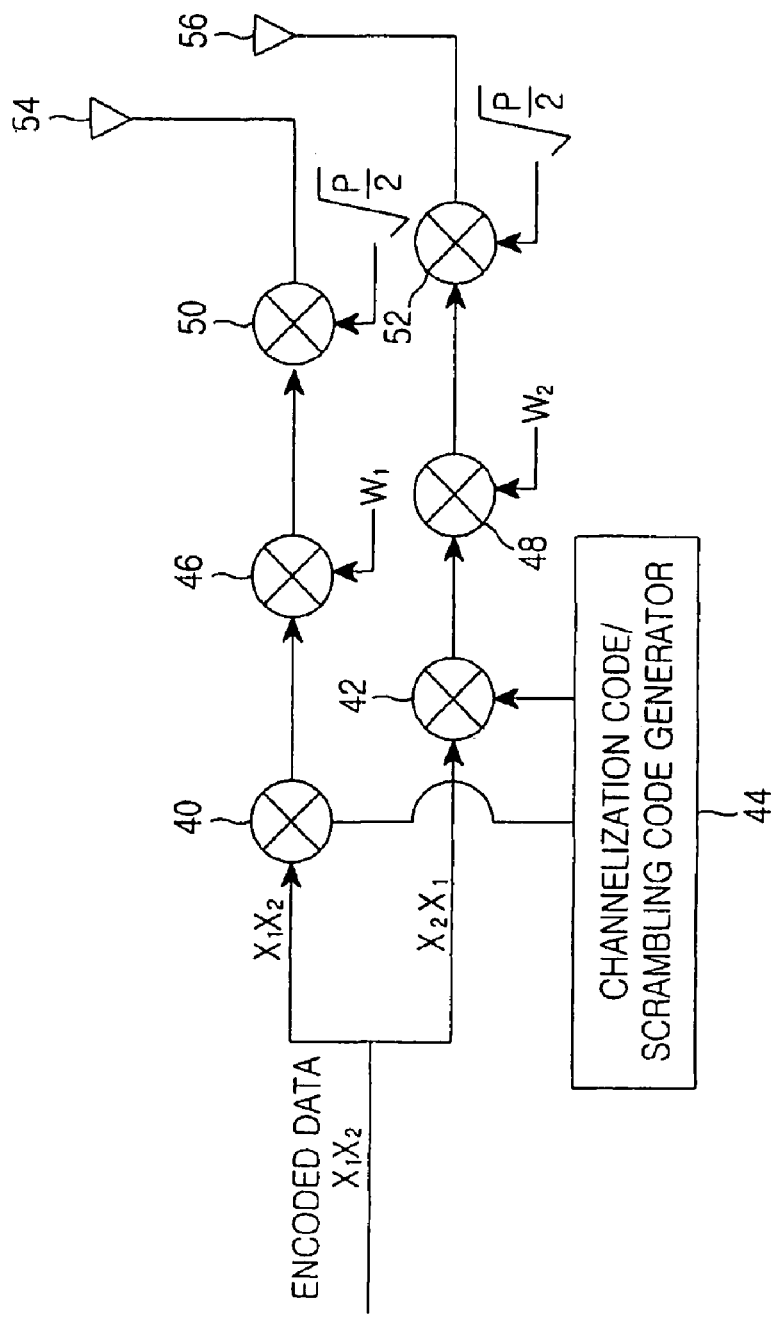
FIG. 3 is a block diagram illustrating an example of a data transmission apparatus using a TxAA scheme.
Figure 4:
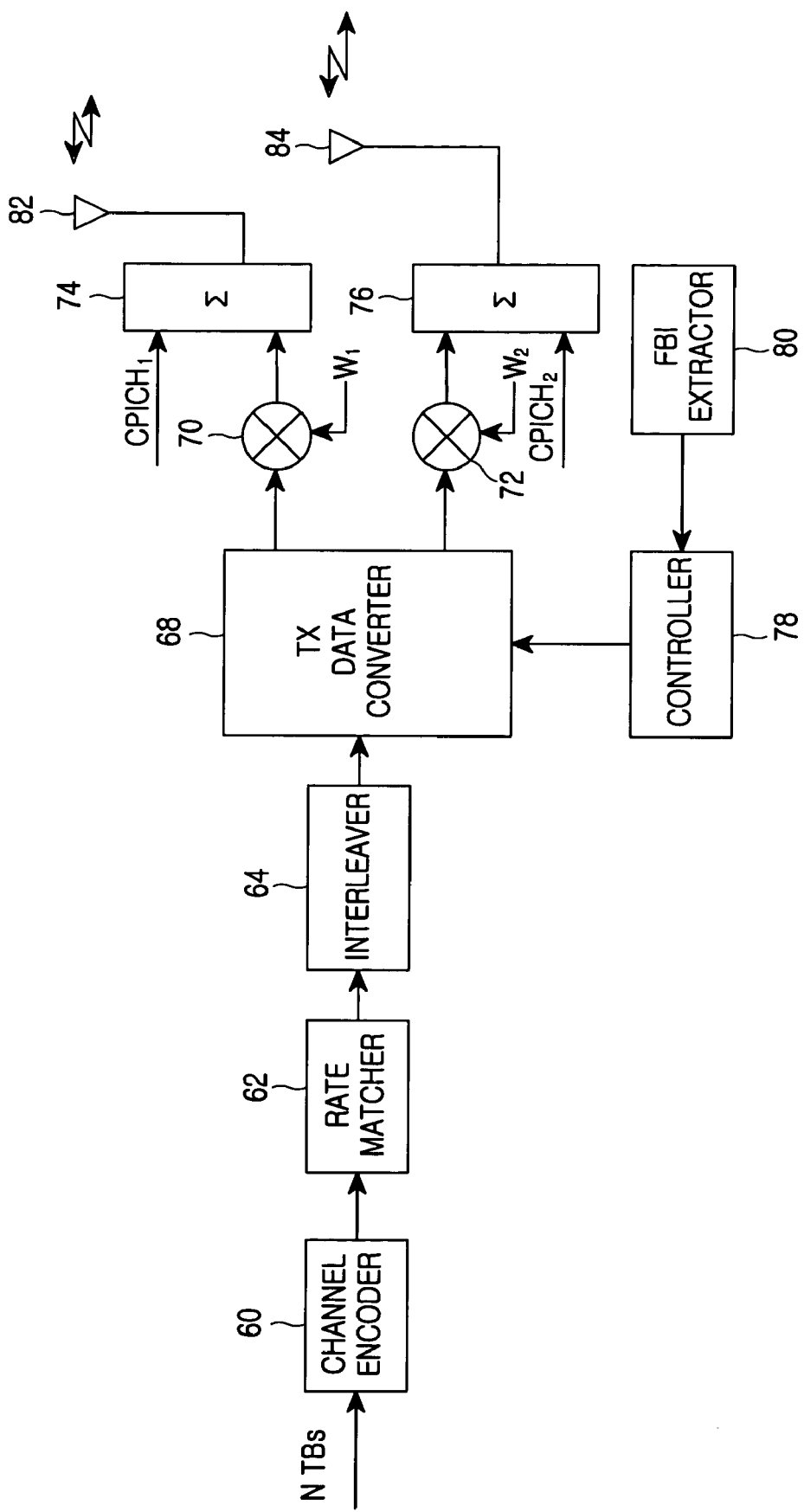
FIG. 4 is a block diagram illustrating an example of an internal structure of a Node B apparatus according to an embodiment of the present invention.

FIG. 4 is a block diagram illustrating an example of an internal structure of a Node B apparatus according to an embodiment of the present invention. Referring to FIG. 4, the Node B apparatus includes a channel encoder 60 for channel-encoding input transport blocks (TBs), a rate matcher 62 for rate-matching a signal output from the channel encoder 60, an interleaver 64 for interleaving a signal output from the rate matcher 62 in a predetermined interleaving method, a transmission data converter 68 for converting a signal output from the interleaver 64 into transmission data according to a corresponding transmit antenna diversity scheme, a controller 78 for controlling a data conversion operation of the transmission data converter 68, a feedback information (FBI) extractor 80 for extracting feedback information transmitted by a UE, multipliers 70 and 72 for multiplying signals output from the transmission data converter 68 by weights, summers 74 and 76 for summing up signals output from the multipliers 70 and 72 and common pilot channel (hereinafter referred to as "CPICH") signals, and antennas 82 and 84 for transmitting signals output from the summers 74 and 76, respectively.

The structure of the Node B's transmission apparatus will be described in detail below. Input transport blocks are applied to the channel encoder 60, and the channel encoder 60 channel-encodes the input transport blocks in a predetermined channel coding scheme, for example, a convolutional coding scheme or a turbo coding scheme, and then provides its output to the rate matcher 62. During the channel coding, the channel encoder 60 determines an effective coding rate such as ½ and ⅓ as its coding rate according to a channel condition. The rate matcher 62 rate-matches a signal output from the channel encoder 60 so that the transport blocks can be matched to a physical channel for transmission. The interleaver 64 interleaves a signal output from the rate matcher 62 in a predetermined interleaving scheme so as to prevent a burst error, and then provides its output to the transmission data converter 68. The transmission data converter 68 converts a signal output from the interleaver 64 according to a corresponding transmit antenna diversity scheme, and then provides the converted transmission data to the multipliers 70 and 72.

Herein, the transmission data converter 68 performs transmission data conversion on an input signal according to a transmit antenna diversity scheme selected under the control of the controller 78. The controller 78 determines a transmit antenna diversity scheme for a transmission signal according to feedback information received from a UE, and a detailed description thereof will be made below. The UE determines a desired transmit antenna diversity scheme according to its channel condition, and transmits the determined transmit antenna diversity scheme as feedback information through a feedback information field of a particular channel, for example, a dedicated physical control channel (hereinafter referred to as "DPCCH"). The Node B then receives the DPCCH signal, and provides the received DPCCH signal to the feedback information extractor 80. The feedback information extractor 80 extracts feedback information from the received DPCCH signal, and provides the extracted feedback information to the controller 78. The controller 78 selects a corresponding transmit antenna diversity scheme based on the feedback information output from the feedback information extractor 80, and controls the transmission data converter 68 to convert a signal output from the interleaver 64 into transmission data according to the selected transmit antenna diversity scheme. A detailed structure of the transmission data converter 68 will be described with reference to FIG. 5.

Figure 5:
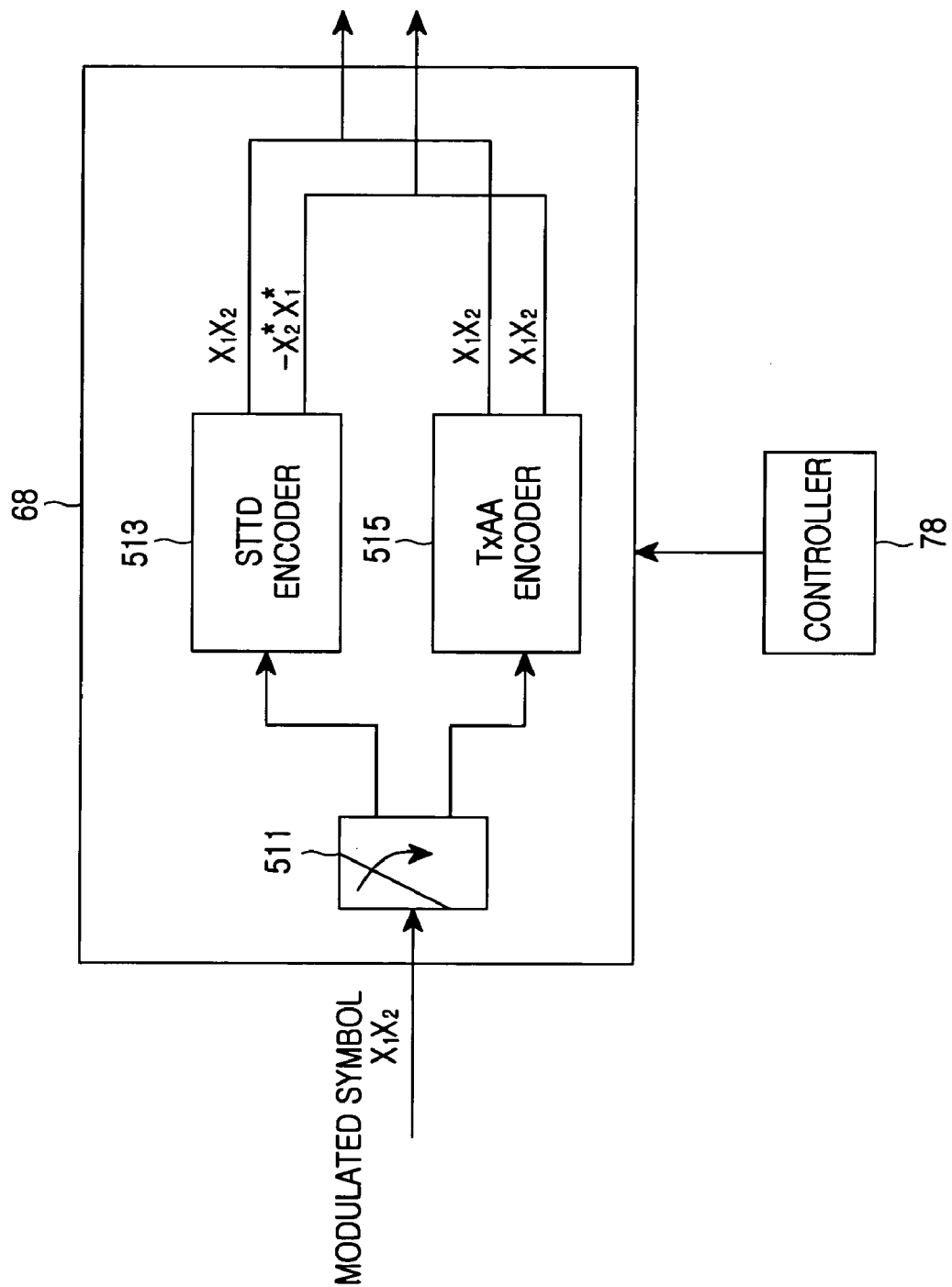
FIG. 5 is a block diagram illustrating an example of the transmission data converter of FIG. 4 according to an embodiment of the present invention.

FIG. 5 is a block diagram illustrating an example of the transmission data converter 68 of FIG. 4 according to an embodiment of the present invention. Referring to FIG. 5, input symbols $(x_1,x_2)$ are applied to a switch 511 after being subjected to transmission data processing processes such as channel coding and interleaving. The switch 511 connects the input symbols $(x_1,x_2)$ to an STTD encoder 513 or a TxAA encoder 515 according to the transmit antenna diversity scheme selected by the controller 78. When the transmit antenna diversity scheme selected by the controller 78 is an STTD scheme, the switch 511 connects the input symbols $(x_1,x_2)$ to the STTD encoder 513. The STTD encoder 513 then STTD-encodes the input symbols $(x_1,x_2)$ and outputs encoded symbols $(x_1,x_2)$ and $(-x_2^*,x_1^*)$. When the transmit antenna diversity scheme selected by the controller 78 is a TxAA scheme, the switch 511 connects the input symbols $(x_1,x_2)$ to the TxAA encoder 515. The TxAA encoder 515 then TxAA-encodes the input symbols $(x_1,x_2)$ and outputs encoded symbols. In the TxAA scheme, input symbols are simply copied without a separate conversion process, so the TxAA encoder 515 repeatedly outputs the same symbols as the input symbols $(x_1,x_2)$.

The symbols output from the transmission data converter 68 are provided to the multipliers 70 and 72. The multiplier 70 multiplies a signal output from the transmission data converter 68 by a weight $w_1$ assigned to the antenna 82, and provides its output to the summer 74. When the symbols output from the transmission data converter 68 are STTD-encoded symbols, the weight $w_1$ is not separately generated. In this case, the multiplier 70 multiplies the output symbols by 1 as the weight $w_1$, or the output symbols are directly provided to the summer 74 without passing through the multiplier 70. In addition, the multiplier 72 multiplies the signal output from the transmission data converter 68 by a weight $w_2$ assigned to the antenna 84, and then provides its output to the summer 76. When the symbols output from the transmission data converter 68 are STTD-encoded symbols, the weight $w_2$ is not separately generated. In this case, the multiplier 72 multiplies the output symbols by 1 as the weight $w_2$, or the output symbols are directly provided to the summer 76 without passing through the multiplier 72. The weights $w_1$ and $w_2$ are determined according to the feedback information received from the UE.

The summer 74 sums up a signal output from the multiplier 70 and a first CPICH signal $CPICH_1$ (e.g., in FIG. 4, $CPICH_1$ indicates a CPICH signal transmitted via a first antenna, or the antenna 82), and then transmits the summation result via the antenna 82. Similarly, the summer 76 sums up a signal output from the multiplier 72 and a second CPICH signal $CPICH_2$ (in FIG. 4, $CPICH_2$ indicates a CPICH signal transmitted via a second antenna, or the antenna 84), and then transmits the summation result via the antenna 84.

The internal structure of the Node B apparatus has been described so far with reference to FIG. 4. Next, an internal structure of a UE will be described with reference to FIG. 6.

Figure 6:
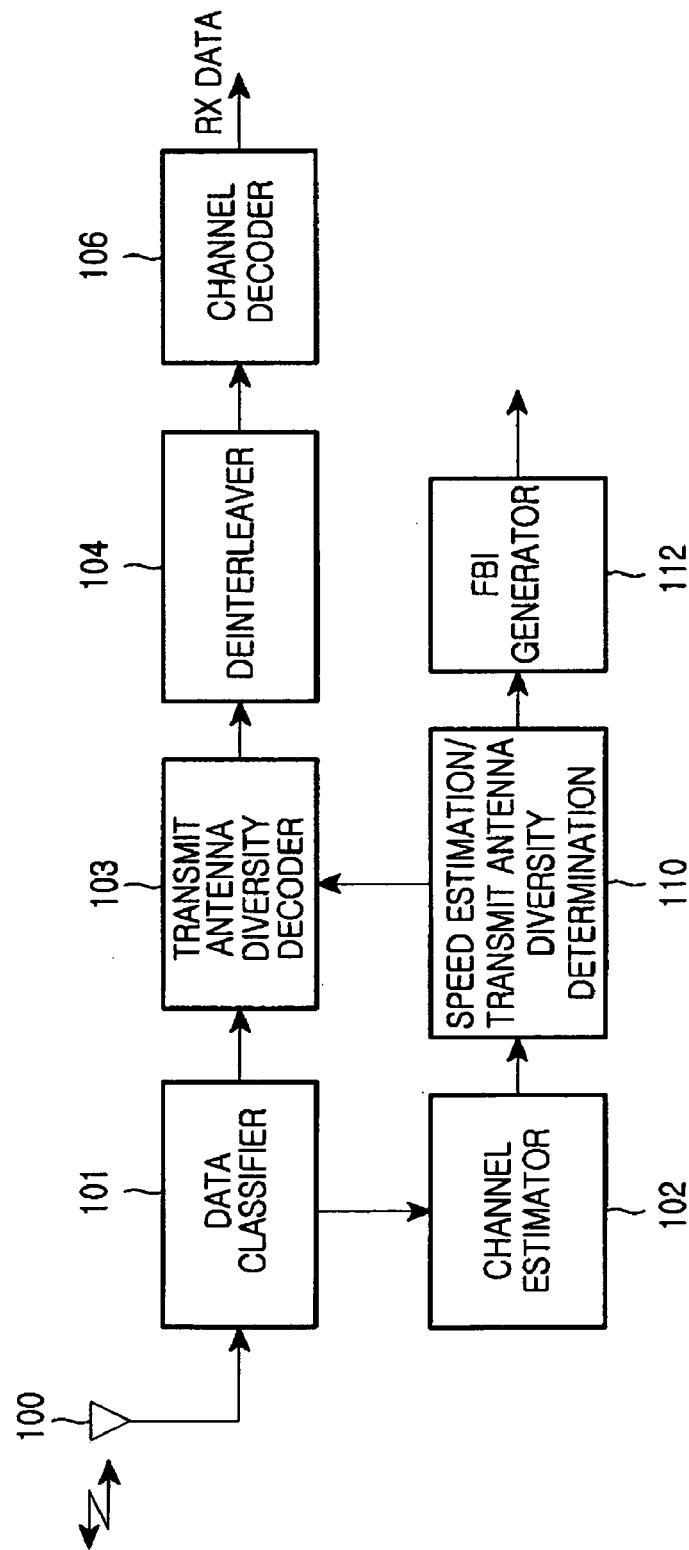
FIG. 6 is a block diagram illustrating an example of an internal structure of a UE according to an embodiment of the present invention.

FIG. 6 is a block diagram illustrating an example of an internal structure of a UE according to an embodiment of the present invention. Referring to FIG. 6, the UE includes an antenna 100 for receiving a signal on a radio channel, a data classifier 101 for classifying signals received through the antenna 100, a channel estimator 102 for performing channel estimation with the signals classified by the data classifier 101, a transmit antenna diversity decoder 103 for performing diversity decoding with the signals classified by the data classifier 101, a speed estimation/transmit antenna diversity determination part 110 for estimating a speed and determining a transmit antenna diversity scheme based on the channel estimation result output from the channel estimator 102, a feedback information generator 112 for generating feedback information according to the determined transmit antenna diversity scheme, a deinterleaver 104 for deinterleaving a signal output from the transmit antenna diversity decoder 103, and a channel decoder 106 for channel-decoding a signal output from the deinterleaver 104.

More specifically, the antenna 100 receives a signal transmitted by a Node B, and outputs the received signal to the data classifier 101. Since the signal transmitted by the Node B is a control signal or the sum of signals targeting a plurality of receivers, the data classifier 101 uses a Walsh code, for example, to classify the received signal. The Walsh code has orthogonality, and due to the orthogonality, the Walsh code has a value of 1 when it is multiplied by itself, and the Walsh code has a value of 0 when it is multiplied by other codes. Therefore, a specific signal can be separated from a plurality of signals mixed in the received signal. Thus, the data classifier 101 multiplies the received signal provided from the antenna 100 by a Walsh code corresponding to a data signal to classify a data signal, i.e., data symbols, from the received signal, and then outputs the classified data symbols to the transmit antenna diversity decoder 103. Further, the data classifier 101 multiplies the received signal provided from the antenna 100 by a Walsh code corresponding to a pilot signal to classify a pilot signal, i.e., pilot symbols, from the received signal, and then provides the classified pilot symbols to the transmit antenna diversity decoder 103.

The channel estimator 102 detects channel information by using a plurality of pilot signals or CPICH signals output from the data classifier 101. A process of detecting channel information by the channel estimator 102 will now be described below. A complex pilot channel signal obtained by despreading a pilot channel signal with a Walsh code is expressed in $$h(n)=A_p S_p c(n)+N(n) \qquad (6)$$

In Equation (6), $A_p$ represents a size of a pilot channel signal, and $S_p$ represents a pilot symbol. Here, the pilot symbol $S_p$ is $S_p=1+j$. Further, in Equation (6), c(n) represents a fading channel response of a pilot channel, and N(n) represents an additive white Gaussian noise (hereinafter referred to as "AWGN").

The channel estimator 102 detects a fading channel response of a pilot channel by multiplying a pilot channel signal output from the data classifier 101, i.e., a pilot channel signal expressed in Equation (6), by a conjugate complex number $s^*_p$ of a corresponding pilot symbol, and the fading channel response of the pilot channel is defined as $$c'(n)=A_p c(n)+N_1(N) \qquad (7)$$

In Equation (7), c'(n) denotes a fading channel response of a pilot channel estimated by the channel estimator 102, and since $A_p$ is generally previously defined between a Node B and a UE, the fading channel response c(n) can be determined by excluding a noise component. Thus, the channel estimator 102 provides a fading channel response c'(n) estimated for the pilot channel to the speed estimation/transmit antenna diversity determination part 110. The speed estimation/transmit antenna diversity determination part 110 estimates a speed of a fading channel from the UE and determines a transmit antenna diversity scheme corresponding to the estimated fading channel speed based on the estimated fading channel response c'(n) output from the channel estimator 102. The "fading channel speed" refers to a variation speed of a fading channel, and although there are several parameters affecting the fading channel speed, a moving speed of a UE will be considered herein.

A description will now be made of a process in which the speed estimation/transmit antenna diversity determination part 110 estimates a speed of the fading channel and determines a transmit antenna diversity scheme corresponding to the estimated fading channel speed.

If a channel speed estimation parameter is defined as $\beta$, an autocorrelation function determined by using an estimated fading channel response c'(n), i.e., $c'(n)=A_p c(n)+N_1(N)$, output from the channel estimator 102 to calculate the channel speed estimation parameter $\beta$ is given by $$R_{c'}(1) = \sum_{n=1}^{M_{pilot}} |c'(n)| \cdot |c'(n+l)| \quad (8)$$

In Equation (8), $R_{c'}(1)$ is an autocorrelation function of the estimated fading channel response c'(n), and $M_{pilot}$ is the number of pilot symbols per packet. A minimum value or an average value of the autocorrelation function $R_{c'}(1)$ of the estimated fading channel response c'(n) represents a variation speed of a channel, i.e., a fading channel. In addition, 1 represents a discrete time index (for $0 \leq 1 \leq M_{pilot}-1$). Therefore, the speed estimation parameter $\beta$ can be expressed as $$\beta=\min \{R_{c'}(1)/\max(R_{c'})\} \text{ or } \beta=\text{mean} \{Rc'(1)/\max (R_{c'})\} \quad (9)$$

In Equation (9), since the speed estimation parameter $\beta$ satisfies a condition of $0 \leq \beta \leq 1$ and is a normalized form of the autocorrelation function $R_{c'}(1)$, this represents a variation state of a channel. That is, in the case of slow fading where channel variation is rare, the speed estimation parameter $\beta$ shows a value approximating 1, while in the case of fast fading where channel variation is frequent, the speed estimation parameter $\beta$ shows a value approximating 0.

Meanwhile, the speed estimation parameter $\beta$ is mapped to a channel speed in a design step of a UE, and the UE stores transmit antenna diversity scheme switching points $T_{\beta 1}$ and $T_{\beta 2}$ which are reference points where a transmit antenna diversity scheme is switched over according to a corresponding speed. In other embodiments of the present invention, a Node B can provide the transmit antenna diversity scheme switching points. A description will now be made of the transmit antenna diversity scheme switching points $T_{\beta 1}$ and $T_{\beta 2}$ with reference to FIG. 7.

Figure 7:
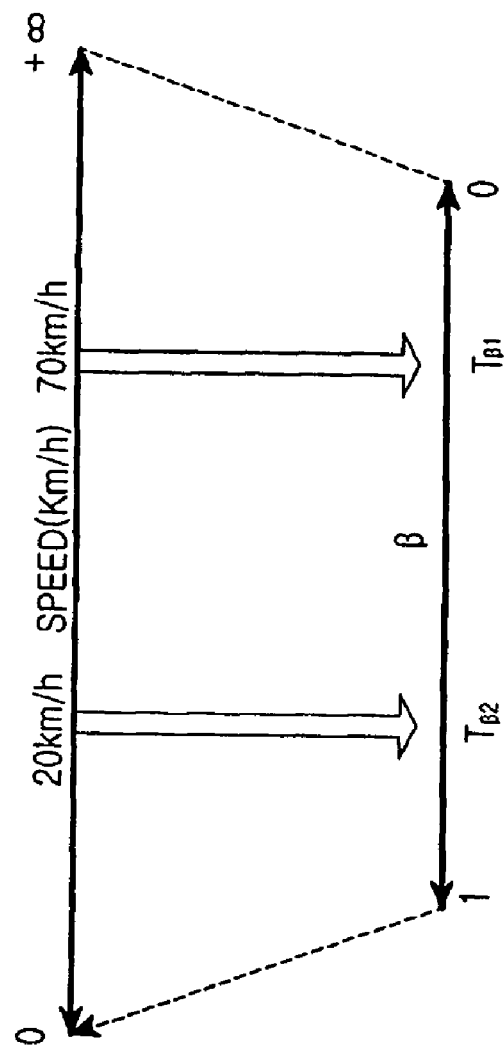
FIG. 7 is a graph illustrating an example of transmit antenna diversity scheme switching points based on a channel speed according to an embodiment of the present invention.

FIG. 7 is a graph illustrating an example of transmit antenna diversity scheme switching points based on a channel speed according to an embodiment of the present invention. A speed axis [Km/h] and a speed estimation parameter $\beta$ axis are shown in FIG. 7. In FIG. 7, the transmit antenna diversity scheme switching point $T_{\beta 1}$ is mapped to a point where the channel speed is 20 [Km/h], and the transmit antenna diversity scheme switching point $T_{62\ 2}$ is mapped to a point where the channel speed is 70 Km/h. As mentioned above, the speed estimation parameter $\beta$ has a value of $0 \leq \beta \leq 1$, so the speed estimation parameter $\beta$ is valid only in a section having a value ranging from 0 to 1.

In addition, with reference to FIG. 8, a description will be made of a mapping relationship between the transmit antenna diversity scheme switching points $T_{\beta 1}$ and $T_{\beta 2}$ and actual transmit antenna diversity schemes.

Figure 8:
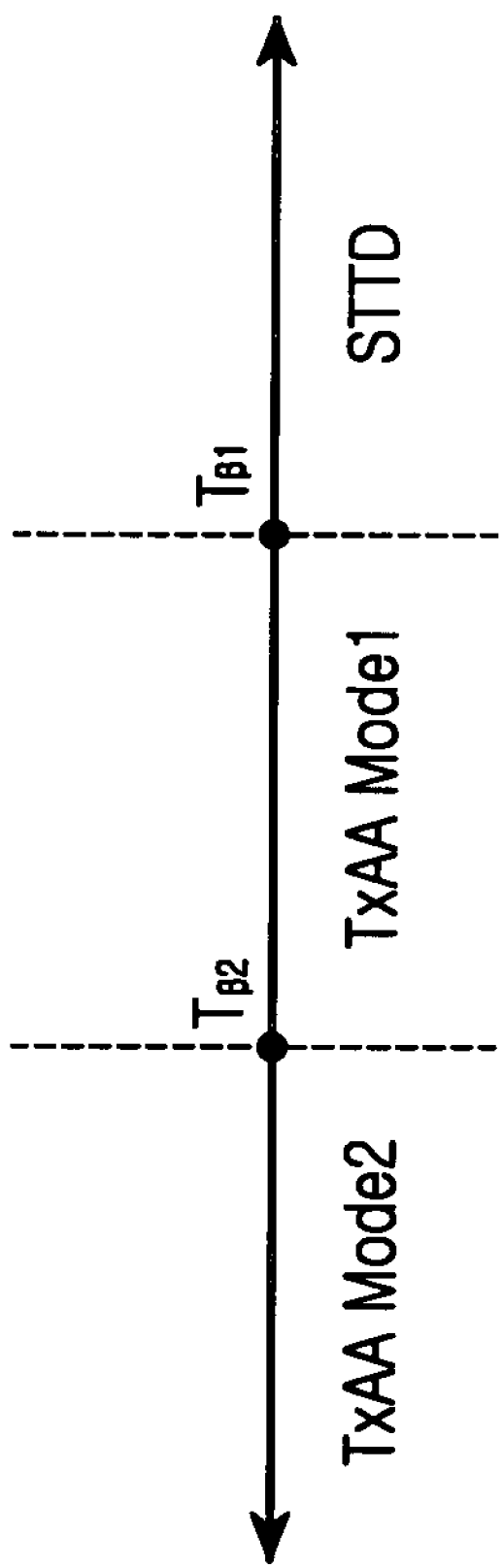
FIG. 8 is a graph illustrating an example of a mapping relationship between transmit antenna diversity scheme switching points and transmit antenna diversity schemes according to an embodiment of the present invention.

FIG. 8 is a graph illustrating an example of a mapping relationship between transmit antenna diversity scheme switching points and actual transmit antenna diversity schemes according to an embodiment of the present invention. Referring to FIG. 8, in a fading channel having a speed lower than or equal to a speed at the transmit antenna diversity scheme switching point $T_{\beta 2}$, the transmit antenna diversity scheme is mapped to a TxAA Mode2 scheme, and in a fading channel having a speed exceeding a speed at the transmit antenna diversity scheme switching point $T_{\beta 2}$ and lower than or equal to a speed at the transmit antenna diversity scheme switching point $T_{\beta 1}$, the transmit antenna diversity scheme is mapped to a TxAA Mode1 scheme. Further, in a fading channel having a speed exceeding a speed at the transmit antenna diversity scheme switching point $T_{\beta 1}$, the transmit antenna diversity scheme is mapped to an STTD scheme.

Meanwhile, the speed estimation/transmit antenna diversity determination part 110, as mentioned above, detects a fading channel speed with the fading channel response c'(n) channel-estimated by the channel estimator 102, determines a transmit antenna diversity scheme corresponding to the detected fading channel response, and then provides information on the determined transmit antenna diversity scheme to the transmit antenna diversity decoder 103 and the feedback information generator 112. The transmit antenna diversity decoder 103 performs symbol decoding on the data symbols output from the data classifier 101 in a transmit antenna diversity scheme corresponding to the transmit antenna diversity scheme information output from the speed estimation/transmit antenna diversity determination part 110, and then provides the decoded data symbols to the deinterleaver 104. The deinterleaver 104 deinterleaves a signal output from the transmit antenna diversity decoder 103 in a deinterleaving scheme corresponding to the interleaving scheme applied in the Node B, and then outputs the deinterleaved signal to the channel decoder 106. The channel decoder 106 channel-decodes a signal output from the deinterleaver 104 in a channel decoding scheme corresponding to the channel coding scheme applied in the Node B, and outputs received data.

The feedback signal generator 112 generates feedback information corresponding to the transmit antenna diversity scheme information output from the speed estimation/transmit antenna diversity determination part 110. That is, when the transmit antenna diversity scheme information output from the speed estimation/transmit antenna diversity determination part 110 indicates a TxAA scheme, the feedback information generator 112 calculates weights to be applied to transmitter's antennas, i.e., Node B's antennas. Of course, when the transmit antenna diversity scheme information output from the speed estimation/transmit antenna diversity determination part 110 indicates an STTD scheme, no weight is applied to the transmitter's antennas, so the feedback information generator 112 does not calculate weights. The feedback information generator 112 generates the feedback information in accordance with a signaling format previously specified by the Node B and the UE. For example, when two signaling bits are assigned as channel speed information, i.e., transmit antenna diversity scheme information, four types of 00, 01, 10 and 11 are available.

The signaling bit value '00' indicates "No Tx diversity" indicating that no transmit antenna diversity is applied, the signaling bit value '01' indicates "TxAA Mode1" indicating that a TxAA Mode1 scheme is applied as the transmit antenna diversity scheme, the signaling bit value '10' indicates "TxAA Mode2" indicating that a TxAA Mode2 scheme is applied as the transmit antenna diversity scheme, and the signaling bit value '11' indicates "STTD" indicating that a STTD scheme is applied as the transmit antenna diversity scheme. When more transmit antenna diversity schemes are provided, it is possible to indicate all of the transmit antenna diversity schemes by increasing the number of signaling bits indicating the speed information. If the transmit antenna diversity scheme is a TxAA scheme, i.e., if the transmit antenna diversity scheme information indicates TxAA Mode1 or TxAA Mode2, the feedback information generator 112 must preferably generate weight information as well as the speed information. The weight information can be generated in a method generally applied in the TxAA scheme or in a new method.

A method for providing feedback information generated by the feedback information generator 112 to the Node B will now be described with reference to FIG. 9.

Figure 9:
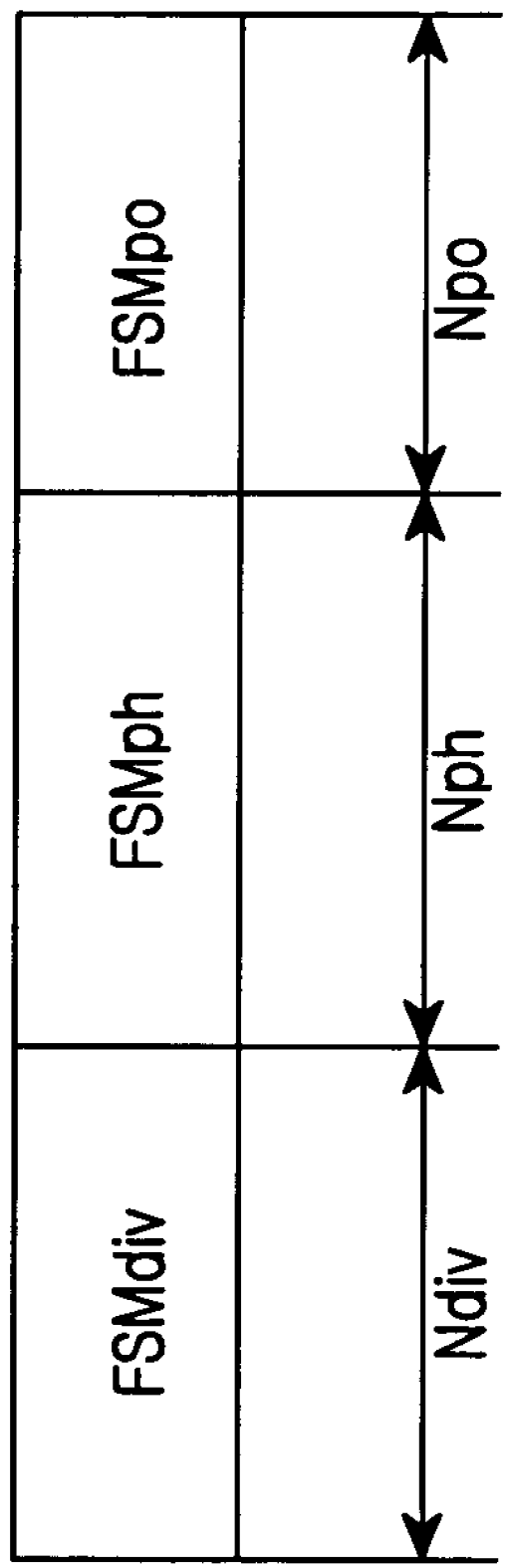
FIG. 9 is a diagram illustrating an example of a format of a feedback information field according to an embodiment of the present invention.

FIG. 9 is a diagram illustrating an example of a format of a feedback information field according to an embodiment of the present invention. Referring to FIG. 9, the feedback information is transmitted from a UE to a UTRAN (UMTS Telecommunication Radio Network), and for example, the UE transmits the feedback information through a feedback information (FBI) field of a dedicated physical control channel (hereinafter referred to as "DPCCH"). The feedback information will be described herein below. The feedback information includes an $N_{div}$-bit feedback signaling message (hereinafter referred to as "FSM") field, i.e., an $FSM_{div}$ field, representing transmit antenna diversity scheme information generated by the feedback information generator 112, an $N_{ph}$-bit FSM field i.e., an $FSM_{ph}$ field, representing phase information, and an $N_{po}$-bit FSM field, i.e., an $FSM_{po}$ field, representing power information.

Next, a procedure for adaptively applying via a Node B a transmit antenna diversity scheme according to a channel environment of a UE will be described with reference to FIG. 10.

Figure 10:
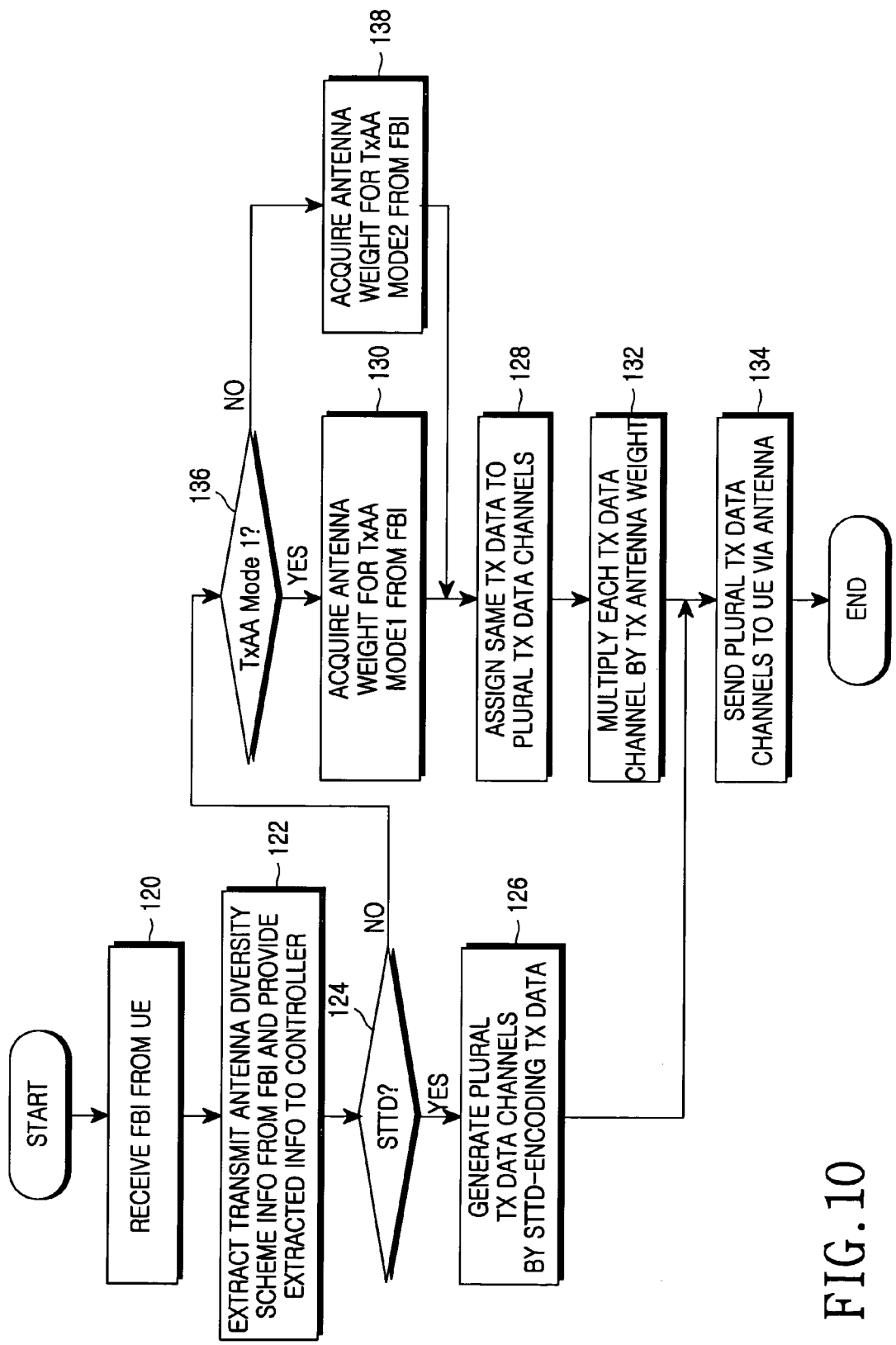
FIG. 10 is a flowchart illustrating a procedure for adaptively applying a transmit antenna diversity scheme by a Node B according to an embodiment of the present invention.

FIG. 10 is a flowchart illustrating a procedure for adaptively applying a transmit antenna diversity scheme by a Node B according to an embodiment of the present invention. Referring to FIG. 10, in step 120, the Node B receives feedback information transmitted by a UE and provides the received feedback information to the feedback information extractor 80. In step 122, the feedback information extractor 80 detects information on a transmit antenna diversity scheme corresponding to the UE from the received feedback information, and provides the detected transmit antenna diversity scheme information to the controller 78. In step 124, the controller 78 determines whether the transmit antenna diversity scheme information provided from the feedback information extractor 80 indicates an STTD scheme. As a result of the determination, if the transmit antenna diversity scheme information provided from the feedback information extractor 80 indicates an STTD scheme, the controller 78 proceeds to step 126. In step 126, the controller 78 controls the transmission data converter 68 to perform data conversion on a signal received from the interleaver 64 in an STTD scheme, and then proceeds to step 134.

However, if it is determined in step 124 that the transmit antenna diversity scheme information output from the feedback information extractor 80 does not indicate an STTD scheme, the controller 78 proceeds to step 136. In step 136, the controller 78 determines whether the transmit antenna diversity scheme information output from the feedback information extractor 80 indicates a TxAA Mode1 scheme. As a result of the determination, if the transmit antenna diversity scheme information output from the feedback information extractor 80 does not indicate a TxAA Mode1 scheme, i.e., indicates a TxAA Mode2 scheme, the controller 78 proceeds to step 138. In step 138, the controller 78 extracts weight information corresponding to the TxAA Mode2 scheme from the feedback information provided from the feedback information extractor 80, and then proceeds to step 128. It should be noted in FIG. 10 that "No Tx diversity" indicating that no transmit antenna diversity scheme is applied was not considered.

If it is determined in step 136 that the transmit antenna diversity scheme information output from the feedback information extractor 80 indicates a TxAA Mode1 scheme, the controller 78 proceeds to step 130. In step 130, the controller 78 extracts weight information corresponding to the TxAA Mode1 scheme from the feedback information provided from the feedback information extractor 80, and then proceeds to step 128. In step 128, the controller 78 controls the transmission data converter 68 to perform data conversion on a signal output from the interleaver 64 in a TxAA scheme, and then proceeds to step 132. In step 132, the Node B multiplies signals output from the transmission data converter 68 by corresponding weights, and then proceeds to step 134. Of course, when the transmit antenna diversity scheme information indicates an STTD scheme, the step 132 can be omitted, or the weights can be set to "1." In step 134, the Node B transmits the signals multiplied by the weights to a UE via the antennas 82 and 84, and then ends the procedure.

The procedure for adaptively applying a transmit antenna diversity scheme by a Node B has been described so far with reference to FIG. 10. Next, a procedure for adaptively applying a transmit antenna diversity scheme by a UE will be described with reference to FIG. 11.

Figure 11:
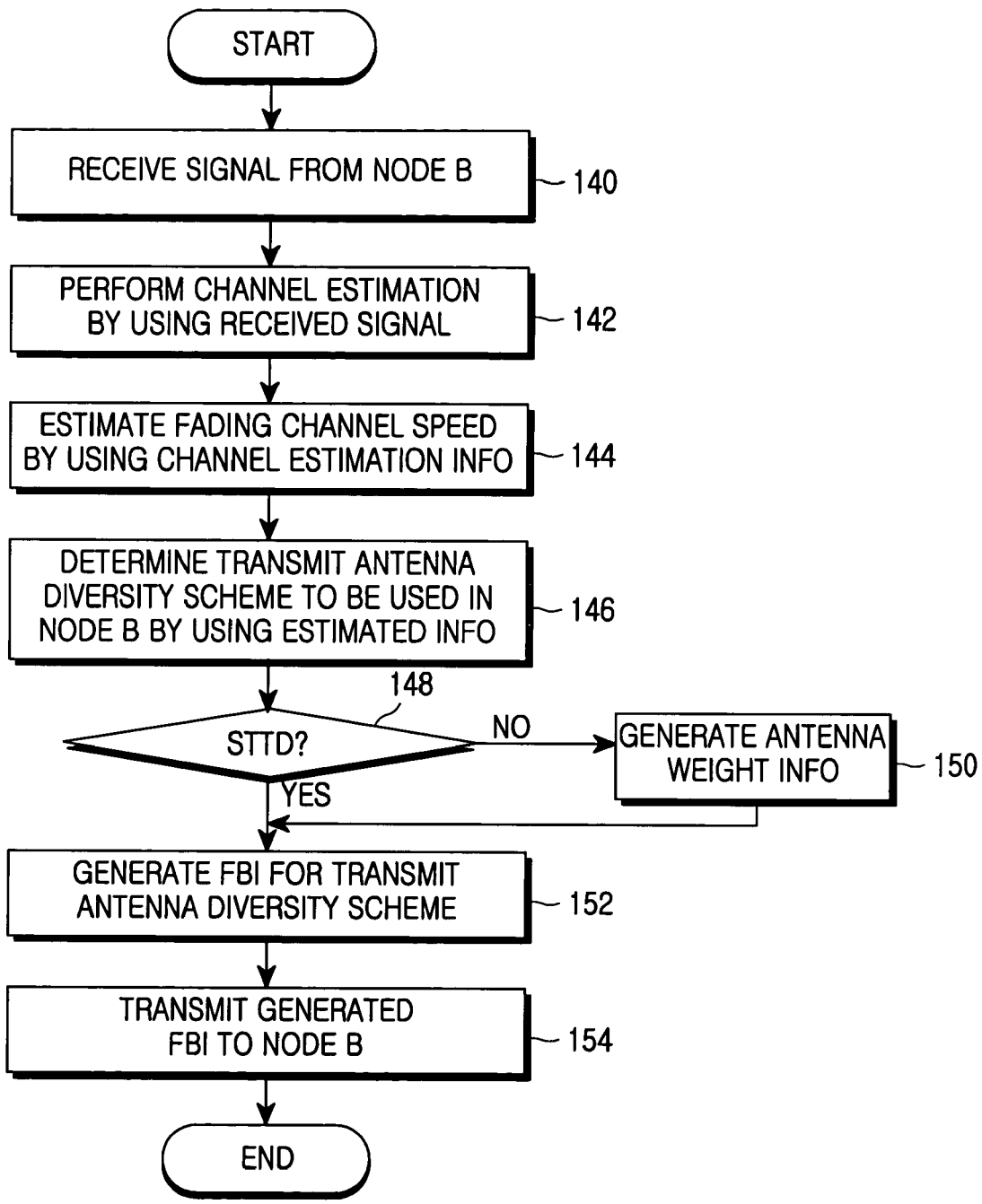
FIG. 11 is a flowchart illustrating a procedure for adaptively applying a transmit antenna diversity scheme by a UE according to an embodiment of the present invention.

FIG. 11 is a flowchart illustrating a procedure for adaptively applying a transmit antenna diversity scheme by a UE according to an embodiment of the present invention. Referring to FIG. 11, in step 140, the UE receives a signal transmitted by a Node B, and then proceeds to step 142. In step 142, the UE estimates a fading channel response with a pilot channel signal among the received signals, and then proceeds to step 144. In step 144, the UE estimates a fading channel speed with the estimated fading channel response, and then proceeds to step 146. In step 146, the UE determines a transmit antenna diversity scheme to be used by the Node B for signal transmission, with the estimated fading channel speed, and then proceeds to step 148. In step 148, the UE determines whether the determined transmit antenna diversity scheme is an STTD scheme. As a result of the determination, if the determined transmit antenna diversity scheme is not an STTD scheme, i.e., if the determined transmit antenna diversity scheme is a TxAA scheme, the UE proceeds to step 150. In step 150, the UE generates weight information to be applied to the TxAA scheme, and then proceeds to step 152. In step 152, the UE generates feedback information corresponding to the determined transmit antenna diversity scheme, and then proceeds to step 154. In step 154, the UE transmits the generated feedback information to the Node B via an antenna, and then ends the procedure.

As described above, in a mobile communication system, particularly in a mobile communication system supporting high-speed data communication such as high speed downlink packet access (HSDPA), embodiments of the present invention adaptively apply a transmit antenna diversity scheme according to a channel condition, thereby securing optimal data communication efficiency.

While the invention has been shown and described with reference to certain embodiments thereof, it will be understood by those skilled in the art that various changes in form and details may be made therein without departing from the spirit and scope of the invention as defined by the appended claims.

What is claimed is:

1. An apparatus for selecting one of an open-loop first transmit antenna diversity scheme and closed-loop second transmit antenna diversity schemes by a user equipment (UE) in a system including a Node B transmitter which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from the UE, the apparatus comprising:
a channel estimator for receiving a first channel signal from the Node B transmitter, and estimating a channel response from the received first channel signal;
a determiner for estimating a variation speed of the first channel based on the estimated channel response, and selecting one of the first and second transmit antenna diversity schemes according to the estimated variation speed of the first channel; and
an information generator for generating information indicating the selected transmit antenna diversity scheme.

2. The apparatus of claim 1, wherein the determiner calculates an autocorrelation value of the channel response, and estimates a speed value mapped to the autocorrelation value as a variation speed of the first channel.

3. The apparatus of claim 1, wherein the information indicating the selected transmit antenna diversity scheme includes a field indicating the selected transmit antenna diversity scheme and a field indicating a weight applied when the selected transmit antenna diversity scheme is used.

4. The apparatus of claim 1, wherein the first channel is a pilot channel.

5. An apparatus for selecting, by a Node B, an open-loop first transmit antenna diversity scheme and closed-loop second transmit antenna diversity scheme and transmitting a channel signal according to the selected transmit antenna diversity scheme in a system, the apparatus comprising:
a Node B which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from a user equipment (UE);
an information extractor for receiving a first channel signal from the UE, and detecting, from the received first channel signal, information indicating one of the first and second transmit antenna diversity schemes, selected by the UE;
a controller for determining a transmit antenna diversity scheme to be applied to channel signals to be transmitted by the Node B, based on the detected information; and
a transmitter for encoding the channel signals according to the determined transmit antenna diversity scheme and transmitting the encoded channel signals.

6. The apparatus of claim 5, wherein the information indicating the transmit antenna diversity scheme includes a field indicating the selected transmit antenna diversity scheme and a field indicating a weight applied when the selected transmit antenna diversity scheme is used.

7. The apparatus of claim 6, wherein the transmitter comprises:
a converter for encoding the channel signals according to the determined transmit antenna diversity scheme;
at least two multipliers for individually multiplying the encoded channel signals by corresponding weights to be applied to the transmit antenna diversity scheme; and
at least two summers for individually summing up the weighted encoded channel signals and corresponding pilot signals, and transmitting the summation results.

8. The apparatus of claim 5, wherein the first channel is a dedicated physical control channel.

9. A method for selecting one of an open-loop first transmit antenna diversity scheme and closed-loop second transmit antenna diversity scheme by a user equipment (UE) in a system including a Node B transmitter which includes at least two antennas and uses the first transmit antenna diversity scheme for transmitting space time transmit diversity (STTD)-encoded signals via the antennas and the second transmit antenna diversity scheme for controlling a phase of signals transmitted from the antennas in response to feedback information including relative phase difference information of the antennas from the UE, the method comprising the steps of:
receiving a first channel signal from the Node B transmitter;
estimating a channel response from the received first channel signal;
estimating a variation speed of the first channel based on the estimated channel response;
selecting one of the first and second transmit antenna diversity schemes according to the estimated variation speed of the first channel; and
transmitting information indicating the selected transmit antenna diversity scheme to the Node B transmitter.

10. The method of claim 9, wherein the step of estimating a variation speed of the first channel comprises the step of calculating an autocorrelation value of the channel response, and estimating a speed value mapped to the autocorrelation value as a variation speed of the first channel.

11. The method of claim 9, wherein the information indicating the selected transmit antenna diversity scheme includes a field indicating the selected transmit antenna diversity scheme and a field indicating a weight applied when the selected transmit antenna diversity scheme is used.

12. The method of claim 9, wherein the first channel is a pilot channel.

13. A method for selecting, by a Node B, one of an open-loop first transmit antenna diversity scheme and closed-loop second transmit antenna diversity scheme and transmitting a channel signal according to the selected transmit antenna diversity scheme in a system, the method comprising the steps of:

receiving a first channel signal from the User Equipment (UE);

detecting, from the received first channel signal, information indicating one of the first and second transmit antenna diversity schemes, selected by the UE, wherein the first transmit antenna diversity scheme is used for transmitting space time transmit diversity (STTD)-encoded signals via the antennas and the second transmit antenna diversity scheme is used for controlling a phase of signals transmitted from the antennas in response to feedback information including relative phase difference information of the antennas from a user equipment (UE);

determining a transmit antenna diversity scheme to be applied to channel signals to be transmitted by the Node B, based on the detected information; and encoding the channel signals according to the determined transmit antenna diversity scheme and transmitting the encoded channel signals.

14. The method of claim 13, wherein the information indicating the transmit antenna diversity scheme includes a field indicating the selected transmit antenna diversity scheme and a field indicating a weight applied when the selected transmit antenna diversity scheme is used.

15. The method of claim 14, wherein the step of encoding the channel signals according to the determined transmit antenna diversity scheme and transmitting the encoded channel signals comprises the steps of:

encoding the channel signals according to the determined transmit antenna diversity scheme;

individually multiplying the encoded channel signals by corresponding weights to be applied to the transmit antenna diversity scheme; and individually summing up the weighted encoded channel signals and corresponding pilot signals, and transmitting the summation results.

16. The method of claim 13, wherein the first channel is a dedicated physical control channel.

* * * * *